United States Patent [19]

Allen, Jr.

[11] Patent Number: 4,895,441

[45] Date of Patent: Jan. 23, 1990

[54] METHOD AND APPARATUS FOR PRECISION RANGING

[75] Inventor: C. Cameron Allen, Jr., Richardson, Tex.

[73] Assignee: Pandel Instruments, Inc., a Texas corporation, Grand Prairie, Tex.

[21] Appl. No.: 27,642

[22] Filed: Mar. 19, 1987

[51] Int. Cl.$^4$ ............................ G01C 3/08; G01S 9/68
[52] U.S. Cl. ........................................... 356/5; 356/4.5; 356/28.5; 367/101
[58] Field of Search ...................... 356/4.5, 5, 4, 28.5; 367/99, 101, 102, 908; 342/127, 128, 130, 124

[56] References Cited

U.S. PATENT DOCUMENTS

| | | |
|---|---|---|
| 2,537,593 | 1/1951 | Landon et al. |
| 3,140,461 | 7/1964 | McKinney |
| 3,728,025 | 4/1973 | Madigan et al. ........................... 356/5 |
| 3,779,645 | 12/1973 | Nakazawa et al. ....................... 356/5 |
| 3,825,340 | 7/1974 | Debart ..................................... 356/5 |
| 3,997,866 | 12/1976 | Taylor et al. |
| 4,140,060 | 2/1979 | Brenner .............................. 356/5 X |
| 4,360,812 | 11/1982 | Peperone |
| 4,403,857 | 9/1983 | Hölscher ................................. 356/5 |
| 4,443,792 | 4/1984 | Pidgeon et al. .................. 342/124 X |
| 4,472,793 | 9/1984 | Bejaminson ......................... 367/102 |
| 4,531,833 | 7/1985 | Ohtomo .................................. 356/5 |
| 4,656,480 | 4/1987 | Allezard et al. |
| 4,712,915 | 12/1987 | Kosakowski et al. ............... 356/5 X |
| 4,721,385 | 1/1988 | Jelalian et al. ........................... 356/5 |
| 4,744,040 | 5/1988 | Kawata et al. .................. 342/124 X |

FOREIGN PATENT DOCUMENTS

| | | |
|---|---|---|
| 0143497 | 5/1985 | European Pat. Off. |
| 0164181 | 11/1985 | European Pat. Off. |
| 2209111 | 6/1974 | France |
| 2173370 | 10/1986 | United Kingdom |

OTHER PUBLICATIONS

Skolnik, M. I., "Frequency-Modulated CW Radar," *Introduction to Radar Systems*, McGraw-Hill Book Co., New York, 1980, pp. 81-92.

*Primary Examiner*—Thomas H. Tarcza
*Assistant Examiner*—Linda J. Wallace
*Attorney, Agent, or Firm*—David H. Judson

[57] ABSTRACT

An improved method and apparatus for precision ranging is described using a frequency-modulated signal source to stimulate creation of interference fringes at a rate proportional to absolute distance to a target. According to the invention, a low frequency modulating signal modulates a relatively high frequency signal source having a predetermined long coherent length compared to the distance to be measured. The resulting frequency-modulated signal is transmitted to the target to generate a reflected version thereof. Because of the long coherent length of the signal source, the transmitted frequency-modulated signal maintains spatial coherence as it travels to and from the target. Moreover, the low frequency modulating signal stimulates production of 360° instantaneous phase differences between the transmitted and received frequency-modulated signals when these signals are superimposed. The number of these 360° phase differences per period of the modulating signal is proportional to a time-of-flight of the transmitted frequency-modulated signal to and from the target and thus absolute distance. In operation, the transmitted and received frequency-modulated signals are logically compared by a balanced demodulator to generate a beat frequency signal from which the number of 360° phase differences per period of the modulating signal is extracted. The beat frequency signal is then processed to determine the distance to the target. Preferably, a reference circuit is used to maintain the frequency stability of the signal source.

6 Claims, 4 Drawing Sheets

METHOD AND APPARATUS FOR PRECISION RANGING

TECHNICAL FIELD

The present invention relates generally to measuring techniques and more particularly to an improved method and apparatus for precision ranging to a target using an acoustical or electromagnetic wave signal source.

BACKGROUND OF THE INVENTION

It is known in the prior art to use an interferometer in a precision ranging system to determine the displacement of a target. Such systems are used in conjunction with underground storage tank leak detection methods to measure height variations in a volume of liquid in the storage tank. One such interferometer includes a signal source, a signal splitter, a signal processing circuit and a reflector associated with the target. In operation, the output of the signal source is split into a reference beam and a transmitted beam. The transmitted beam is reflected from the target by the reflector and combined with the reference beam to produce first and second quadrature output signals, each of the output signals being an interference fringe pattern. If the target is stable, the fringe pattern in each output signal remains substantially fixed. However, if the target is moving, the rate of fringe production changes at a rate proportional to the target's velocity of movement. Because velocity is proportional to displacement, the velocity information can be processed by the signal processing circuit to determine the distance to the target.

Prior art interferometers of the type described above do not provide range or distance information to a stationary target. Moreover, such devices also fail to operate properly if the distance to the target is longer than the coherent length of the transmitted beam. In particular, as the beam travels beyond its coherent length, the resultant interference fringes get larger and eventually smear, thus preventing accurate velocity (and therefore displacement) measurement. These devices have therefore proven wholly inadequate for certain precision ranging applications.

There is therefore a need for an improved method and apparatus for precision ranging which accurately measures distance to a target and which overcomes the problems associated with prior art interferometer devices.

BRIEF SUMMARY OF THE INVENTION

An improved method and apparatus for precision target ranging is described wherein a low frequency signal is used to modulate a relatively high frequency ranging signal prior to its transmission to the target. The low frequency modulation stimulates instantaneous phase differences between the transmitted signal and the signal reflected from the target when these signals are superimposed on each other. The number of 360° instantaneous phase differences produced per period of the low frequency signal is proportional to the time-of-flight of the ranging signal to and from the target, and therefore is proportional to the distance to the target.

According to a preferred method of the invention, a low frequency modulating signal modulates a relatively high frequency signal source having a predetermined long coherent length compared to the distance to be measured. The resulting frequency-modulated signal is transmitted to the target to generate a reflected version thereof. The transmitted frequency-modulated signal maintains spatial coherence as it travels to and from the target due to the long coherent length of the signal source. In operation, the transmitted and received frequency-modulated signals are logically combined via a balanced demodulator to generate a beat frequency signal representing a number of 360° instantaneous phase differences between the transmitted and received signals per unit time. These 360° phase differences are caused by the low frequency modulating signal, and the number of these phase differences per period of the modulating signal is proportional to the time-of-flight of the transmitted frequency-modulated signal to and from the target. The beat frequency signal is then processed to determine the distance to the target.

In the preferred embodiment, a reference target is used in conjunction with a reference circuit to maintain the frequency stability of the signal source. The reference circuit preferably includes a reference transmitter located a predetermined distance from the reference target and connected to the signal source for transmitting the frequency-modulated signal to the reference target. A reference receiver, also located a predetermined distance from the reference target, receives a reflected version of the transmitted frequency-modulated signal from the reference target and in response thereto generates a reference frequency-modulated signal. The frequency-modulated signal and the reference frequency-modulated signal are logically combined to generate a reference beat frequency signal proportional to the time-of-flight of the transmitted frequency-modulated signal to and from the reference target. The reference beat frequency signal is then processed to produce an error signal which is fed-back to the signal source to maintain the output thereof within predetermined error limits.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
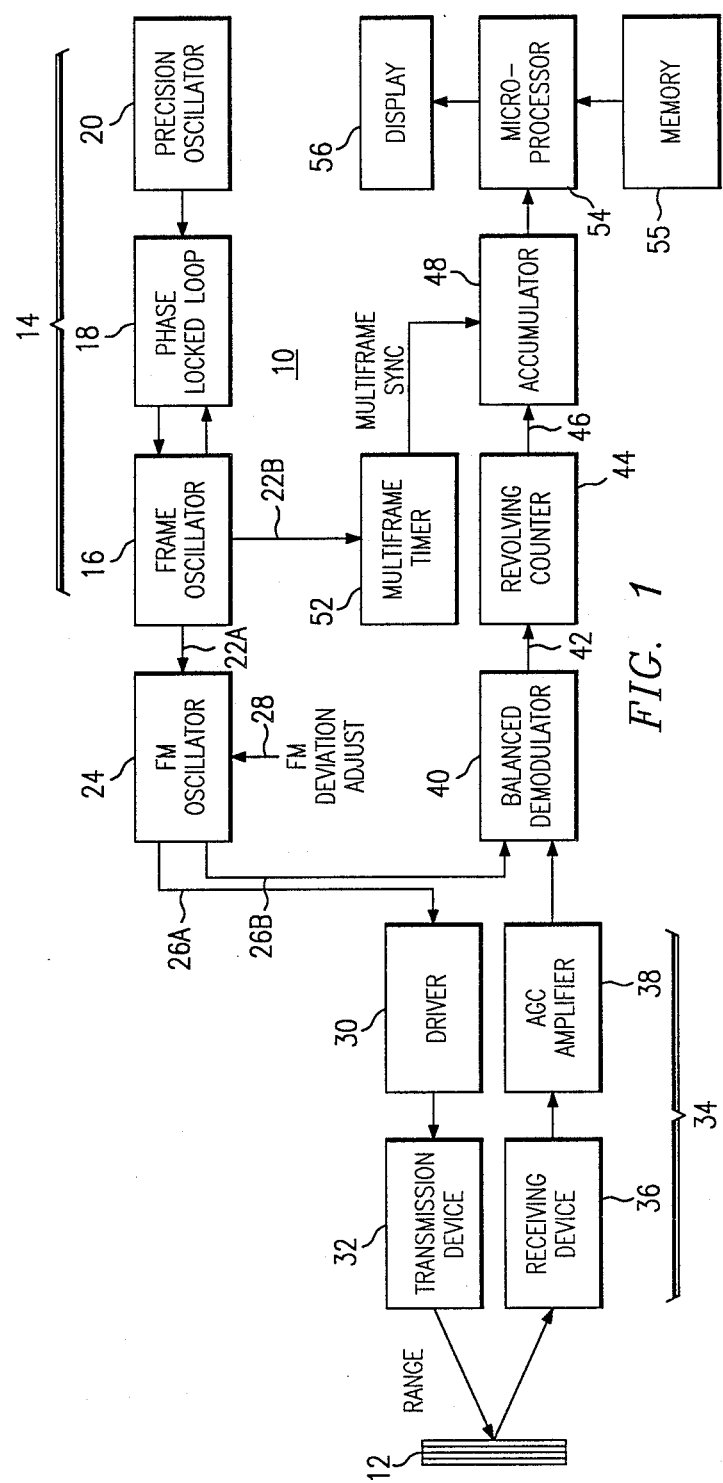
FIG. 1 is a schematic block diagram of a first embodiment of the precision ranging apparatus of the present invention.

With reference now to the drawings wherein like reference characters designate like or similar parts throughout the several views, FIG. 1 is a schematic block diagram of a first embodiment of a precision ranging apparatus 10 according to the present invention. Although not meant to be limiting, the precision ranging apparatus 10 can be used to detect leaks in an underground storage tank based on measurement of volumetric changes of the height of the liquid stored in the tank.

The apparatus 10 operates generally to measure the absolute distance to a target 12 using a low frequency-modulated carrier signal as the transmitted ranging beam. The low frequency modulation is generated by a frame oscillator circuit 14 comprising frame oscillator 16, phase-locked loop circuit 18 and clock oscillator 20. The frame oscillator 16 has first and second outputs for generating a modulating signal on lines 22a and 22b, respectively, each signal having a predetermined first frequency inversely proportional to its period, or "frame". The modulating signal on line 22a is preferably a sine wave while the signal on line 22b is a square wave. The frequency of each modulating signal is maintained within precise limits by the phase-locked loop circuit 18 and the clock oscillator 20 in a manner which is conventional in the art.

Figure 3A:
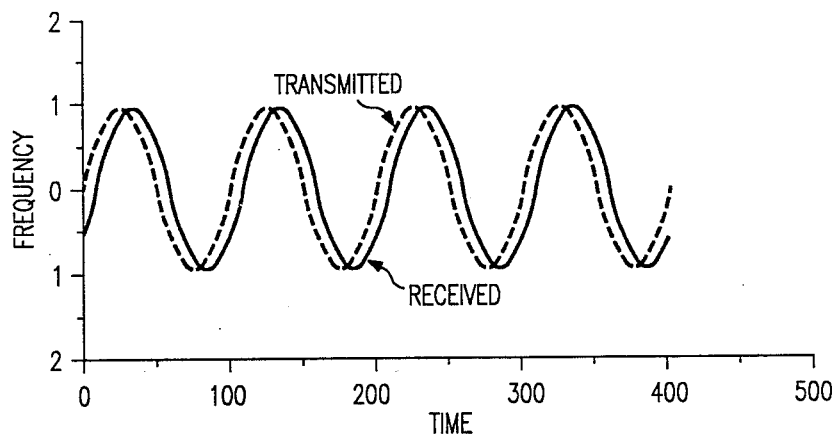
FIG. 3A is a frequency versus time representation of the deviation frequency of the transmitted and received frequency-modulated signals according to the invention.
Figure 3B:
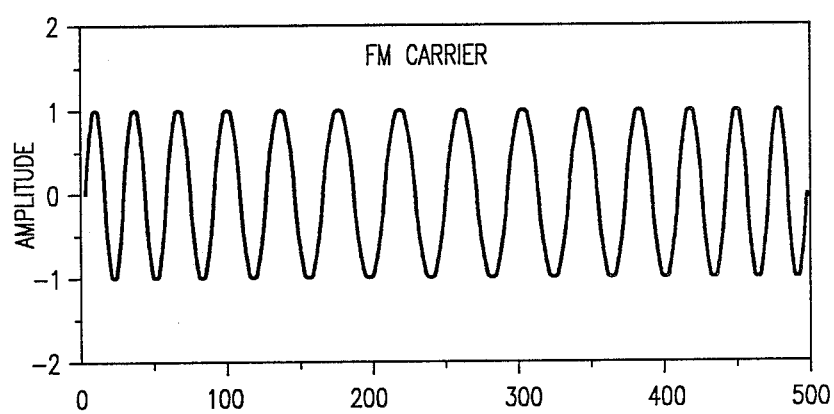
FIG. 3B is an amplitude versus time representation of the transmitted frequency-modulated signal.

The sine wave version of the modulating signal is applied via line 22a to a modulator input of a "carrier" or signal source oscillator 24. The signal source oscillator 24 preferably has a predetermined frequency substantially greater than the frequency of the frame oscillator 16. Signal source oscillator 24 has first and second outputs connected to lines 26a and 26b. In operation, the low frequency modulating signal from the frame oscillator circuit 14 modulates the high frequency signal source oscillator 24 to generate a frequency-modulated signal on each output line 26a and 26b. Preferably, the frequency modulated signal on line 26a is a sine wave (as seen in FIG. 3B) while the frequency-modulated signal on line 26b is a square wave. The signal source oscillator 24 also includes a deviation adjust input 28 which is used to maintain the frequency of the frequency-modulated signals within predetermined limits. In this embodiment, the deviation adjust input 28 is preset in an open-loop manner.

The sine wave version of the frequency-modulated signal on line 26a is applied through a driver circuit 30, e.g., an amplifier, to a transmission device 32. The transmission device 32 converts the frequency-modulated signal input thereto into an appropriate form for transmission to the target depending on the nature of the system. For example, in an acoustic ranging system, signal source oscillator 24 generates an electrical signal which is converted to acoustical (i.e., sound) waves by a piezoelectric transducer or the like as the transmission device 32. In a laser ranging system, the laser itself includes the driver 30 and transmission device 32.

According to a feature of the invention, the signal source for the ranging system (i.e., oscillator 24, driver 30 and transmission device 32) has a "coherent length" which is longer than the combined distance the transmitted frequency-modulated signal must travel to and from the target. As used herein, "coherent length" refers to the maximum distance that a set of waves can travel from a signal source and still be maintained in predictable phase relation. Accordingly, because the distance to be measured is never longer than the coherent length of the signal source, the transmitted signal always maintains spatial coherence as it travels to and from the target. The significance of this aspect of the invention will be apparent in the discussion below.

The precision ranging apparatus 10 also includes a receiver circuit 34 for receiving a reflected version of the transmitted frequency-modulated signal from the target 12. The receiver circuit 34 comprises a receiving device 36, e.g., a piezoelectric transducer in the acoustic embodiment or an optical interferometer and a photodiode in the laser embodiment, and an automatic gain control ("AGC")/trigger circuit 38. AGC/trigger circuit 38 generates a received frequency-modulated signal having a substantially square waveform. For example, in the laser embodiment, it is well known that an optical interferometer mixes optical signals and the photodiode connected thereto receives the mixed signal and generates an electrical signal. The electrical signal consists of a low frequency, amplitude-modulated signal which is then converted (by AGC circuit 38) to a variable duty cycle squarewave whose frequency is proportional to a number of aphasic events as will be described below. As can be appreciated from the above description, only the transmission and receiving devices (e.g., devices 32 and 34 in FIG. 1) need to be specifically tailored to the type of ranging signal. In the laser of "optical" embodiment, the devices 32 and 34 are the optical interferometer and photodetector; in the acoustic embodiment a piezoelectric transducer is used in each device for the appropriate signal conversion.

If the signal transmitted to the target is not modulated, as in the prior art, the interference fringes produced by mixing the transmitted and received signals remain stationary if the target is not in motion. Evaluation of such fringes therefore provides no information regarding distance to the target. However, by modulating the signal source oscillator 24 (and thus the signal source) with the low frequency modulating signal according to the present invention, phase differences between the transmitted and received signals are stimulated when these signals are superimposed on each other. Each time this phase difference goes through 360°, a new "interference fringe" is created. Moreover, the number of such 360° phase differences, i.e., aphasic events, created during a period of the modulating signal is proportional to the time-of-flight of the transmitted frequency-modulated signal to and from the target. From time-of-flight information, the distance to the target can be calculated directly. Accordingly, the ranging apparatus of the present invention provides absolute distance measurement rather than measurement based on differential movement of the target as in the prior art.

According to the invention, the number of 360° phase differences produced per period of the modulating signal is determined by comparing, in a balanced demodulator 40, the received frequency-modulated signal with the square wave version of the frequency-modulated signal from signal source oscillator 24. The balanced demodulator therefore operates to "superimpose" the transmitted and received frequency-modulated signals on each other to create interference fringes. Although not meant to be limiting, the balanced demodulator 40 of the invention preferably comprises an exclusive-OR gate, a smoothing filter and a conventional Schmitt trigger circuit. As is well known, the exclusive-OR gate of the balanced demodulator 40 produces a logic high output if one, but only one, of the input signals to the gate is a logic high. Therefore, whenever the frequency-modulated signal from the signal source oscillator 24 and the received frequency-modulated signal are out-of-phase, the output of the exclusive-OR gate remains at a logic high level. The output of the gate does not change until the instantaneous phase difference between these signals goes through 360° and the signals are in-phase. The gate output is filtered by the smoothing filter and "squared-up" by the Schmitt trigger circuit of the balanced demodulator 40 to produce a beat frequency signal representing the number of 360° instantaneous phase differences between the transmitted and received frequency-modulated signals per unit time. As described above, the beat frequency signal is proportional to the time-of-flight of the transmitted frequency-modulated signal to and from the target.

Referring back to FIG. 1, the beat frequency signal output from the balanced demodulator 40 is then processed to determine the absolute distance of the target 12. In particular, the beat frequency signal is supplied via line 42 to a revolving counter 44 which preferably generates an 8-bit digital count on parallel bus 46. As described above, each time the phase between the transmitted and received signals differs by 360°, an interference fringe is created. The count on bus 46 indicates the number of fringes (i.e., the number of 360° instantaneous phase differences) which are created per period or "frame" of the modulating signal. The use of a revolving counter 44 rather than a reset counter insures that all of the 360° instantaneous phase differences occurring over multiples frames are counted.

The output of the revolving counter 44 is supplied via bus 46 to an accumulator 48 having a synchronization input 50. According to the preferred embodiment of the invention, the time-of-flight information extracted from the beat frequency signal is "averaged" over a number of frames of the modulating signal. In particular, the square wave version of the modulating signal on line 22b is used to synchronize a multiframe timer 52, the output of which is connected to the synchronization input 50 of the accumulator 48. The multiframe timer 52 is programmed to generate a synchronization signal to the accumulator 48 such that the counts output from revolving counter 44 are accumulated over a predetermined number of periods (or frames) of the modulating signal. The use of the accumulator 48 and the multiframe timer 52 insures that the beat frequency signal is averaged over a long enough period of time to provide accurate distance information.

The output of the accumulator 48 represents a frequency signal, i.e., the number of fringes (or 360° phase differences) which are created per unit time, which is then converted to units of "distance" by a microprocessor 54. Particularly, the microprocessor 54 includes a suitable memory 55 for storing a computer program which calculates the absolute distance to the target based on a priori knowledge of how many fringes are produced from a known "unit" distance. This information is obtained during calibration of the apparatus. The calculated distance is then output on a suitable display device 56.

Accordingly, the present invention provides an improved method and apparatus for precision target ranging wherein a low frequency signal modulates a long coherent length transmitted beam to stimulate phase differences between the transmitted and received beams when these beams are superimposed. The number of 360° phase differences produced per period of the modulating signal is then proportional to the time-of-flight of the transmitted signal which, in turn, is proportional to the absolute distance to the target. The time-of-flight information is used directly to calculate the distance to the target.

Figure 2:
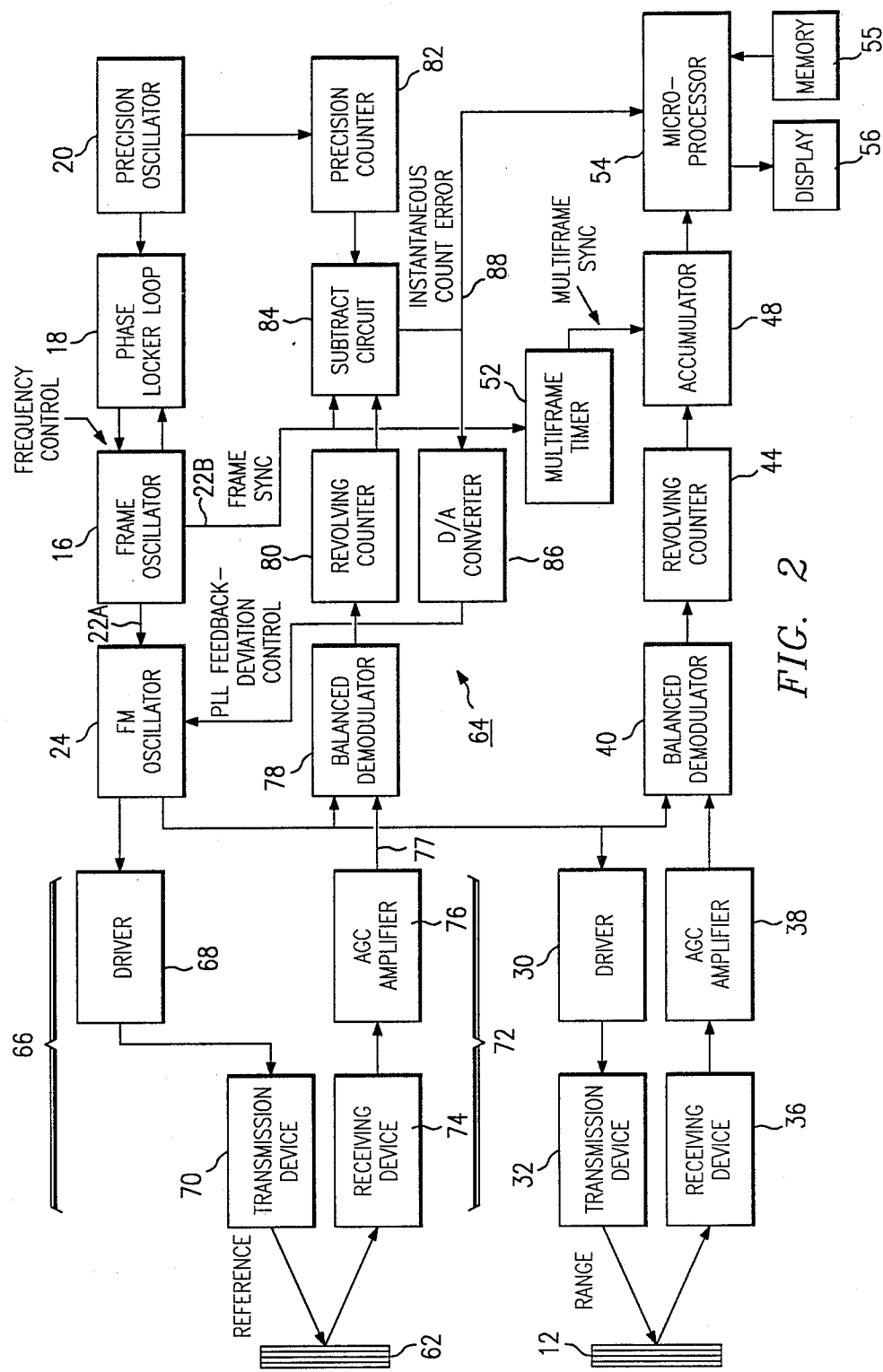
FIG. 2 is a schematic block diagram of the preferred embodiment of the precision ranging apparatus of the present invention having a reference circuit for controlling the stability of a signal source of the apparatus.

Referring now to FIG. 2, a preferred embodiment of a precision ranging apparatus 60 is shown. In the embodiment, a reference target 62 is used in conjunction with a reference circuit 64 to maintain the output of signal source oscillator 24 stable. In particular, the reference circuit 64 includes the reference target 62 located a predetermined distance from a reference transmitter 66 comprising driver circuit 68 and transmission device 70. The reference transmitter 66 is connected to the signal source oscillator 24 for transmitting the frequency-modulated signal to the reference target 62. The reference circuit 64 includes a reference receiver 72 including a receiving device 74 and an AGC/trigger circuit 76. The reference receiver 72 is also located a predetermined distance from the reference target 62 for receiving a reflected version of the transmitted frequency-modulated signal and in response thereto generating a reference frequency-modulated signal on a line 77. The transmitted and reference frequency-modulated signals are compared in a balanced demodulator 78 of the reference circuit 60, which is similar to the balanced demodulator 40 of FIG. 1. Particularly, the balanced demodulator 78 generates a reference beat frequency signal proportional to the time-of-flight of the transmitted frequency-modulated signal to and from the reference target. As described above, the low frequency modulation on the signal transmitted to the reference target stimulates production of a number of 360° instantaneous phase differences between the transmitted and received frequency-modulated signals, with the number of such phase differences per period of the modulating signal being proportional to the time-of-flight of the transmitted frequency-modulated signal to and from the reference target.

The output of the balanced demodulator 78 is supplied to a revolving counter 80 which generates a count indicating the number of the 360° phase differences created per period. To maintain the stability of the signal source oscillator 24, a precision counter 82 is preprogrammed to output a predetermined count per unit time as it is driven by the clock oscillator 20. In particular, the predetermined count is equal to the velocity of the transmitted frequency-modulated signal in the particular medium divided by the known distance to and from the reference target. Referring back to FIG. 2, the outputs of the counters 80 and 82 are compared in a subtract circuit 84 to generate a digital error signal. The digital error signal, which represents the count error at the start and end of the multiframe measurement, is converted to analog form by D/A converter 86 and supplied as a feedback voltage to the deviation adjust input 28 of the signal source oscillator 24. In this manner, the count error signal output from subtract circuit 84 is continually driven to zero to maintain the output of the signal source oscillator 24 locked in a stable fashion to the output of the precision counter 82. The phase error information is also provided to the microprocessor via line 88 for use in calculating the absolute distance to the target.

The computer program stored in memory 55 implements the following formula used to calculate absolute distance to the target:

$$D_T = \frac{N_R \sin(D_R/\lambda)}{N_T \sin(D_T/\lambda)} \times D_R$$

where;
$D_T$ is the unknown distance to and from the target,
$D_R$ is the known distance to and from the reference target,
$N_R$ is the total number of counts to and from the reference target, $N_T$ is the total number of counts to and from the target, and $\lambda$ is the wavelength of the modulating signal, The "sin" terms in the above equation are required because the deviation frequency plots of the transmitted and received frequency-modulated signals continuously differ in phase. This relationship is seen in FIG. 3A. Comparison of the deviation frequency curves in FIG. 3A shows that the instantaneous frequency difference between these curves is also a "sin" function, and it is this latter function which is represented in the distance formula. Moreover, because the distance formula includes the unknown distance "$D_T$" on the righthand portion thereof, its solution requires an iterative approximation which is implemented by the computer program stored in memory 55. Although not shown in detail, the formula may also include a correction factor to compensate for the count error at the start and end of the multiframe measurement.

Although the invention has been described in detail, the same is by way of illustration and example only and is not to be taken by way of limitation, the spirit and scope of the invention being limited only to the terms of the appended claims.

I claim:

1. A precision optical ranging apparatus for measuring absolute distance to a target, comprising:
   means for generating a sinusoidally-varying modulating signal having a predetermined first frequency, the first frequency inversely proportional to a period;
   a signal source having a long coherent length compared to the distance to be measured and having a predetermined second frequency substantially greater than the predetermined first frequency, the signal source having an input for receiving the modulating signal and in response thereto generating a frequency-modulated signal;
   means for converting the frequency-modulated signal into an optical waveform and for transmitting the frequency-modulated signal in its optical waveform to the target, the transmitted frequency-modulated signal maintaining spatial coherence as it travels to and from the target due to the long coherent length of the signal source;
   a receiver for receiving from the target a reflected version of the transmitted frequency-modulated signal in its optical waveform and in response thereto generating a received frequency-modulated signal;
   means for comparing the frequency-modulated signal and the received frequency-modulated signal to generate a beat frequency signal representing a number of 360° instantaneous phase differences between the frequency-modulated signal and the received frequency-modulated signal per period caused by the sinusoidally-varying modulating signal, wherein the beat frequency signal is proportional to the absolute distance to the target provided the absolute distance is smaller than the coherent length of the signal source;
   means for processing the beat frequency signal to determine the absolute distance to the target;
   a reference target;
   a reference transmitter located a predetermined distance from the reference target and connected to the signal source, the reference transmitter for transmitting the frequency-modulated signal in its optical waveform to the reference target;
   a reference receiver located a predetermined distance from the reference target for receiving from the reference target a reflected version of the transmitted frequency-modulated signal in its optical waveform and in response thereto generating a received reference frequency-modulated signal;
   means for comparing the reference frequency-modulated signal and the received reference frequency-modulated signal to generate a reference beat frequency signal representing a number of 360° instantaneous phase differences between the reference frequency-modulated signal and the received reference frequency-modulated signal per period caused by the modulating signal; and
   means for processing the reference beat frequency signal to maintain the frequency of the frequency-modulated signal output from the signal source within predetermined limits.

2. The precision optical ranging apparatus as described in claim 1 wherein the means for processing the beat frequency signal comprises:
   means for receiving the beat frequency signal and in response thereto generating a count of the number of 360° instantaneous phase differences per period of the modulating signal;
   means for accumulating the count over a predetermined number of periods; and
   means connected to the accumulating means for calculating the absolute distance to the target.

3. The precision optical ranging apparatus as described in claim 1 wherein the means for processing the reference beat frequency signal comprises:
   counter means for receiving the reference beat frequency signal and in response thereto generating a count of the number of 360° phase differences per period of the sinusoidally-varying modulating signal;
   means for generating a reference count as a function of the predetermined distance to and from the reference target;
   means for comparing the count with the reference count and in response thereto generating an error signal; and
   means for connecting the error signal to the signal source to maintain the frequency of the frequency-modulated signal within predetermined limits.

4. The precision ranging apparatus as described in claim 3 wherein the means for connecting includes a digital-to-analog converter.

5. A precision acoustical ranging system, comprising:
   means for generating a sinusoidally-varying modulating signal having a predetermined first frequency, the first frequency inversely proportional to a period;
   a signal source oscillator having a predetermined second frequency substantially greater than the predetermined first frequency, the signal source oscillator having an input for receiving the modulating signal and in response thereto generating a frequency-modulated signal;
   a reference target;
   a reference transmitter including a piezoelectric transducer located a predetermined distance from the reference target for receiving the frequency-modulated signal from the signal source oscillator and in response thereto converting the frequency-modulated signal into an acoustic waveform and transmitting the frequency-modulated signal to the reference target;

a reference receiver including a piezoelectric transducer located a predetermined distance from the reference target for receiving from the reference target a reflected version of the transmitted frequency-modulated signal in its acoustic waveform and in response thereto generating a reference frequency-modulated signal;

a target;

a transmitter including a piezoelectric transducer located an unknown distance from the target and connected to the signal source oscillator for converting the frequency-modulated signal into an acoustic waveform and transmitting the frequency-modulated signal in its acoustic waveform to the target;

a receiver including a piezoelectric transducer located an unknown distance from the target for receiving a reflected version of the transmitted frequency-modulated signal in its acoustic waveform and in response thereto generating a received frequency-modulated signal;

means for comparing the frequency-modulated signal and the reference frequency-modulated signal to generate a reference beat frequency signal proportional to the time-of-flight of the frequency-modulated signal in its acoustic waveform to and from the reference target;

means for receiving the reference beat frequency signal and in response thereto generating an error signal;

means for connecting the error signal to the signal source oscillator to maintain the frequency of the frequency-modulated signal output therefrom within predetermined limits;

means for comparing the frequency-modulated signal and the received frequency-modulated signal to generate a beat frequency signal proportional to the time-of-flight of the frequency-modulated signal in its acoustic waveform to and from the target; and means for processing the beat frequency signal to determine the unknown distance to the target.

6. An acoustical ranging method for measuring the distance to a target, comprising the steps of:

generating a sinusoidally-varying modulating signal having a predetermined first frequency inversely proportional to a period;

modulating a signal source with the modulating signal to generate a frequency-modulated signal, the signal source having a long coherent length compared to the distance to be measured and having a predetermined second frequency substantially greater than the first frequency;

converting the frequency-modulated signal to an acoustic waveform and transmitting the frequency-modulated signal in its acoustic waveform to the target in a spatially-coherent manner;

receiving from the target a reflected version of the transmitted frequency-modulated signal in its acoustic waveform and in response thereto generating a received frequency-modulated signal;

superimposing the frequency-modulated signal and the received frequency-modulated signal to generate a beat frequency signal representing a number of 360° instantaneous phase differences between the frequency-modulated signal and the received frequency-modulated signal per period caused by the modulating signal;

processing the beat frequency signal to determine the distance to the target;

converting the frequency-modulated signal to an acoustic waveform and transmitting the frequency-modulated signal in its acoustic waveform to a reference target located at a predetermined distance;

receiving a reflected version of the frequency-modulated signal in its acoustic waveform from the reference target and in response thereto generating a reference frequency-modulated signal;

superimposing the frequency-modulated signal and the reference frequency-modulated signal to generate a reference beat frequency signal proportional to the time-of-flight of the frequency-modulated signal in its acoustic waveform to and from the reference target; and processing the reference beat frequency signal to generate an error signal for use in maintaining the frequency of the signal source within predetermined limits.

* * * * *